Figure 1:
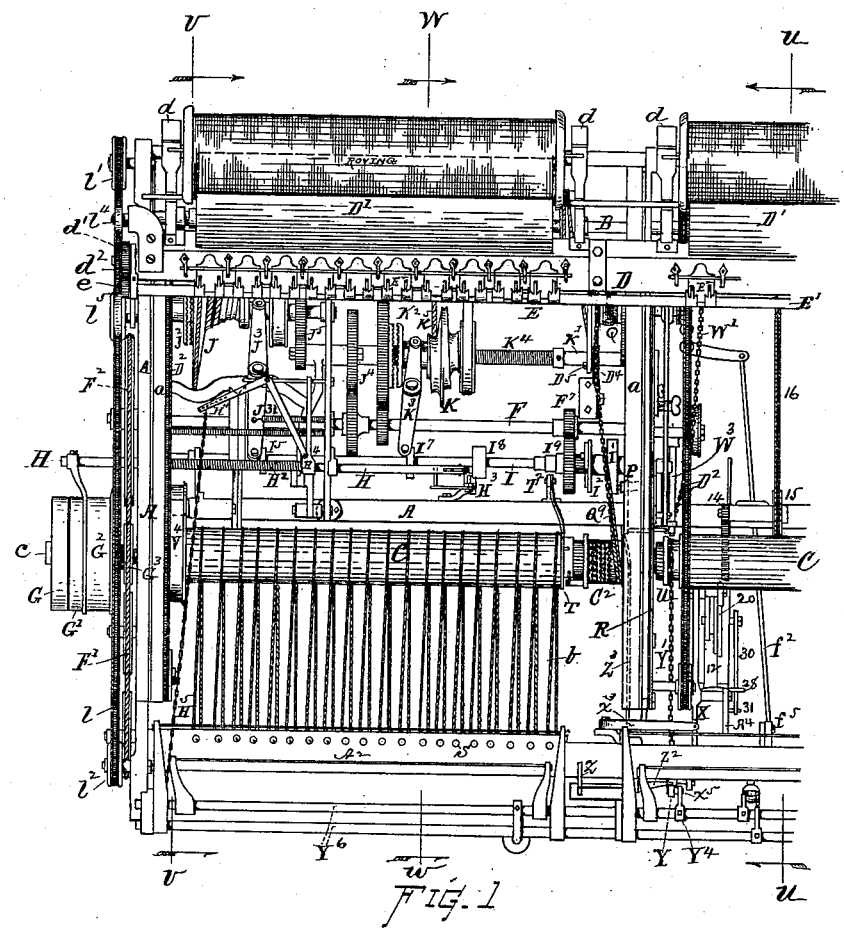

(No Model.) 10 Sheets—Sheet 1.

E. WRIGHT.
SPINNING MULE.

No. 370,840. Patented Oct. 4, 1887.

WITNESSES
Frank L. Wheeler
Ella P. Blenus

INVENTOR.
Edward Wright
By Chas. H. Burleigh
Attorney.

(No Model.) 10 Sheets—Sheet 2.
E. WRIGHT.
SPINNING MULE.
No. 370,840. Patented Oct. 4, 1887.
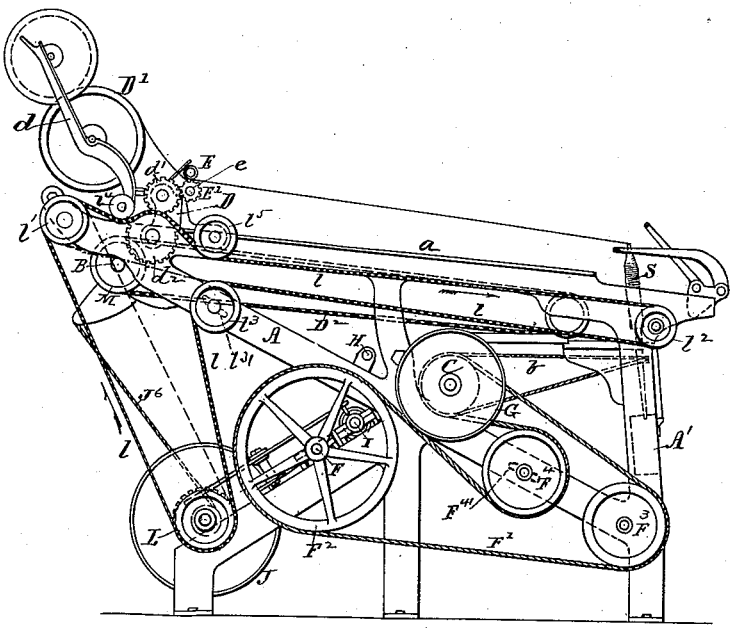
Fig. 2.
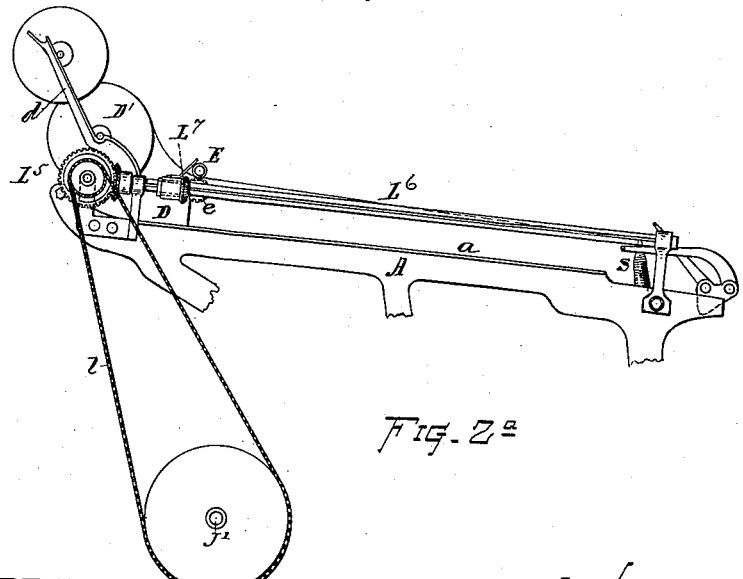
Fig. 2ª
WITNESSES
Frank L. Wheeler.
Ella P. Blood.
INVENTOR
Edward Wright
By Chas. H. Burleigh

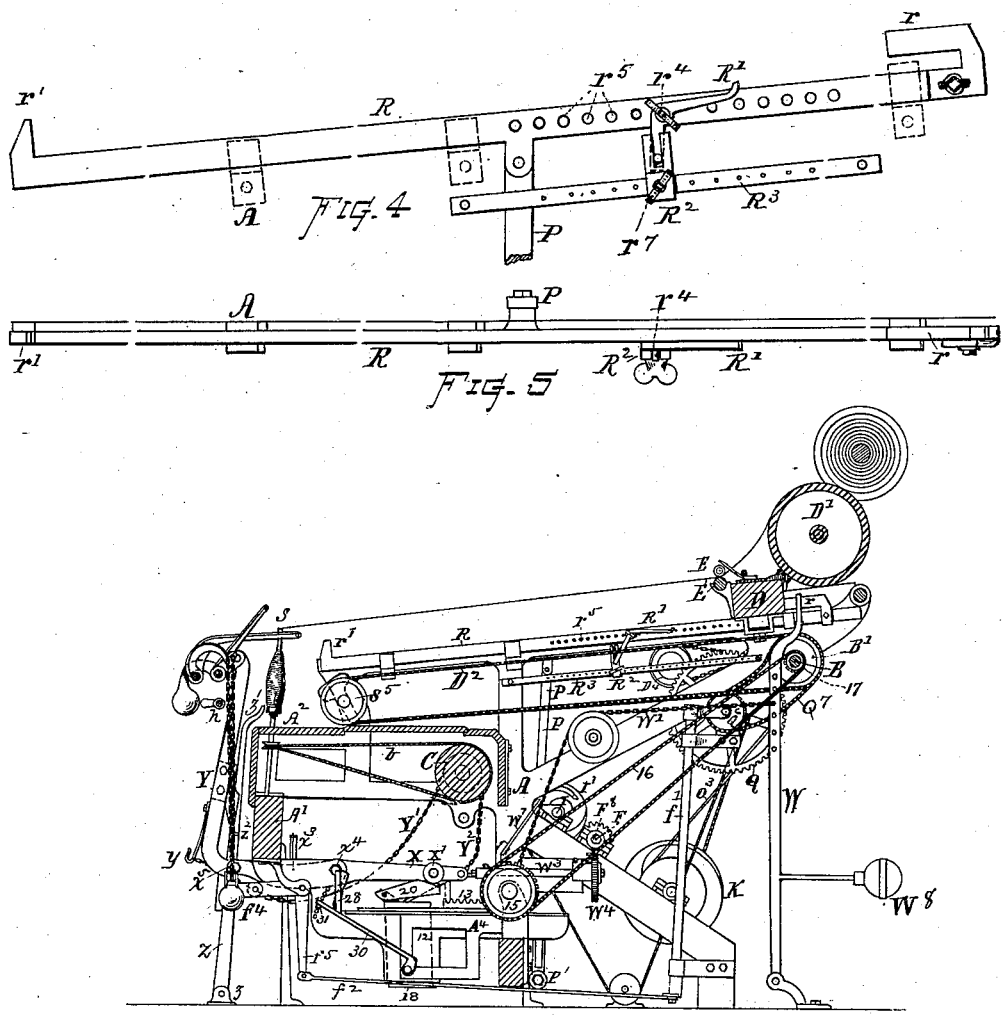

(No Model.) 10 Sheets—Sheet 4.
E. WRIGHT.
SPINNING MULE.
No. 370,840. Patented Oct. 4, 1887.
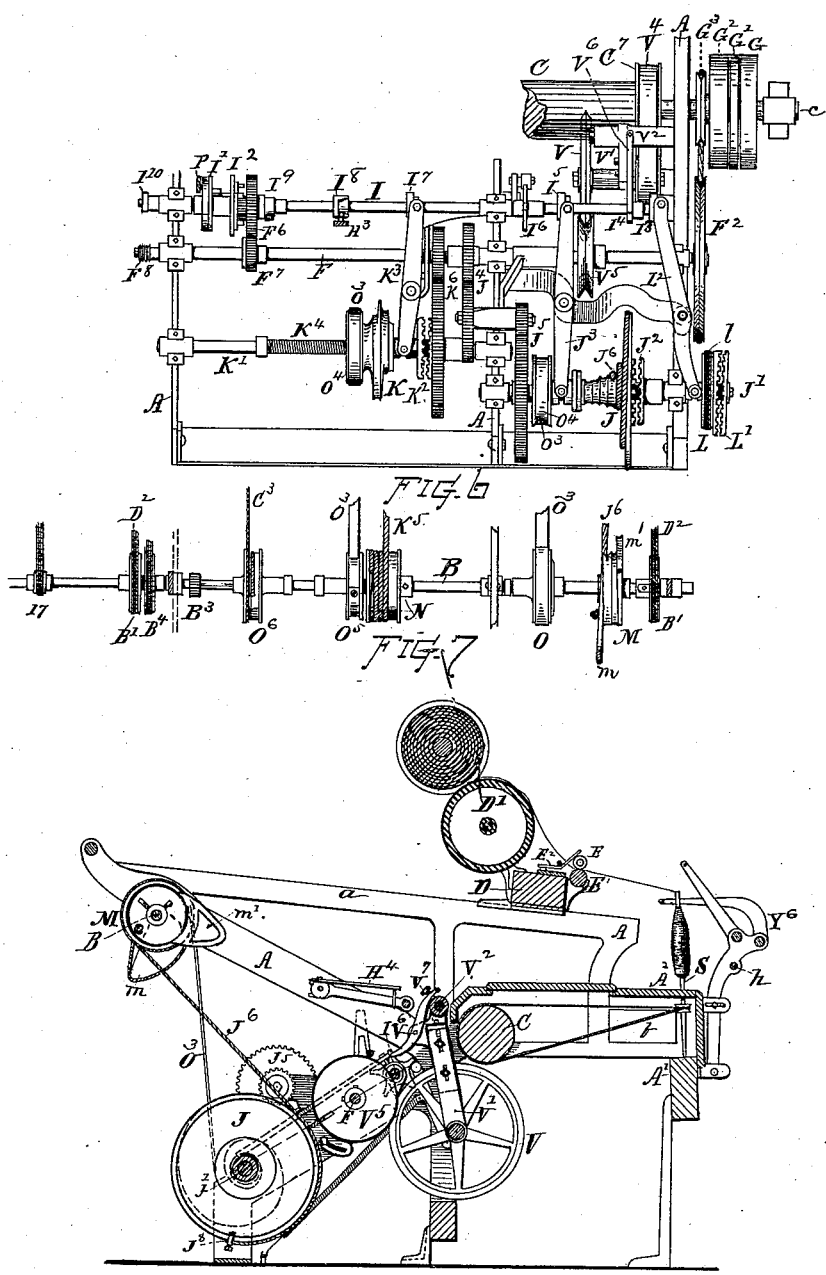
WITNESSES
Frank L. Wheeler
Ella P. Blenus
INVENTOR
Edward Wright
By Chas. H. Burleigh
Attorney

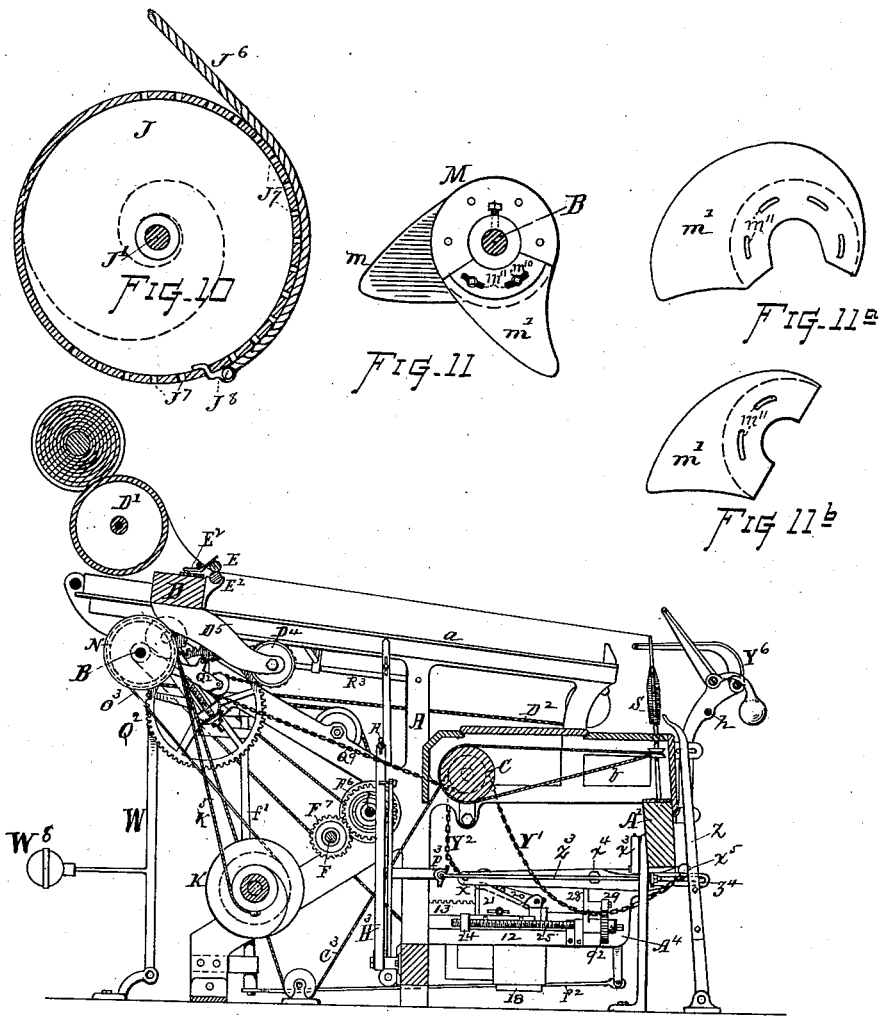

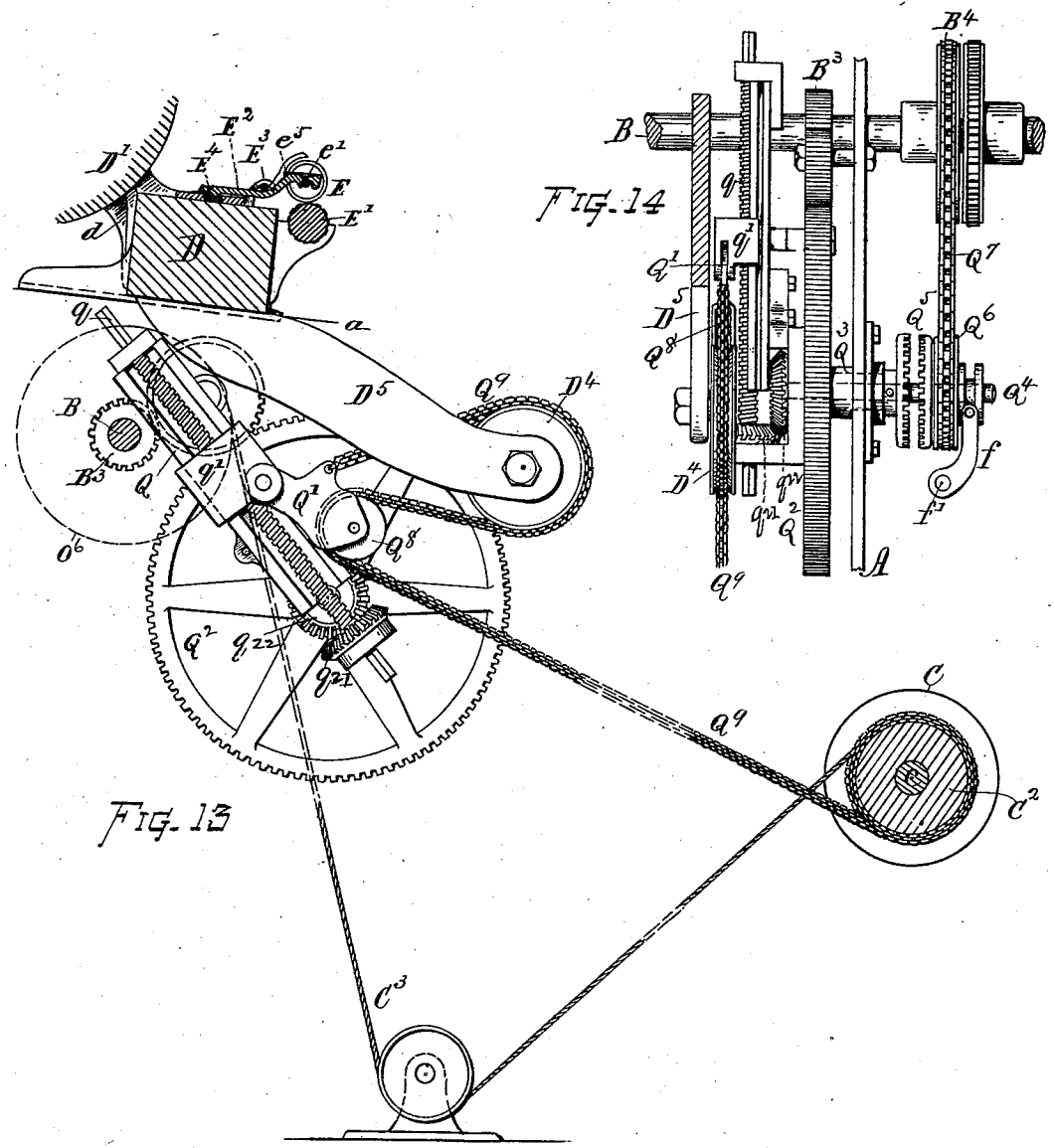

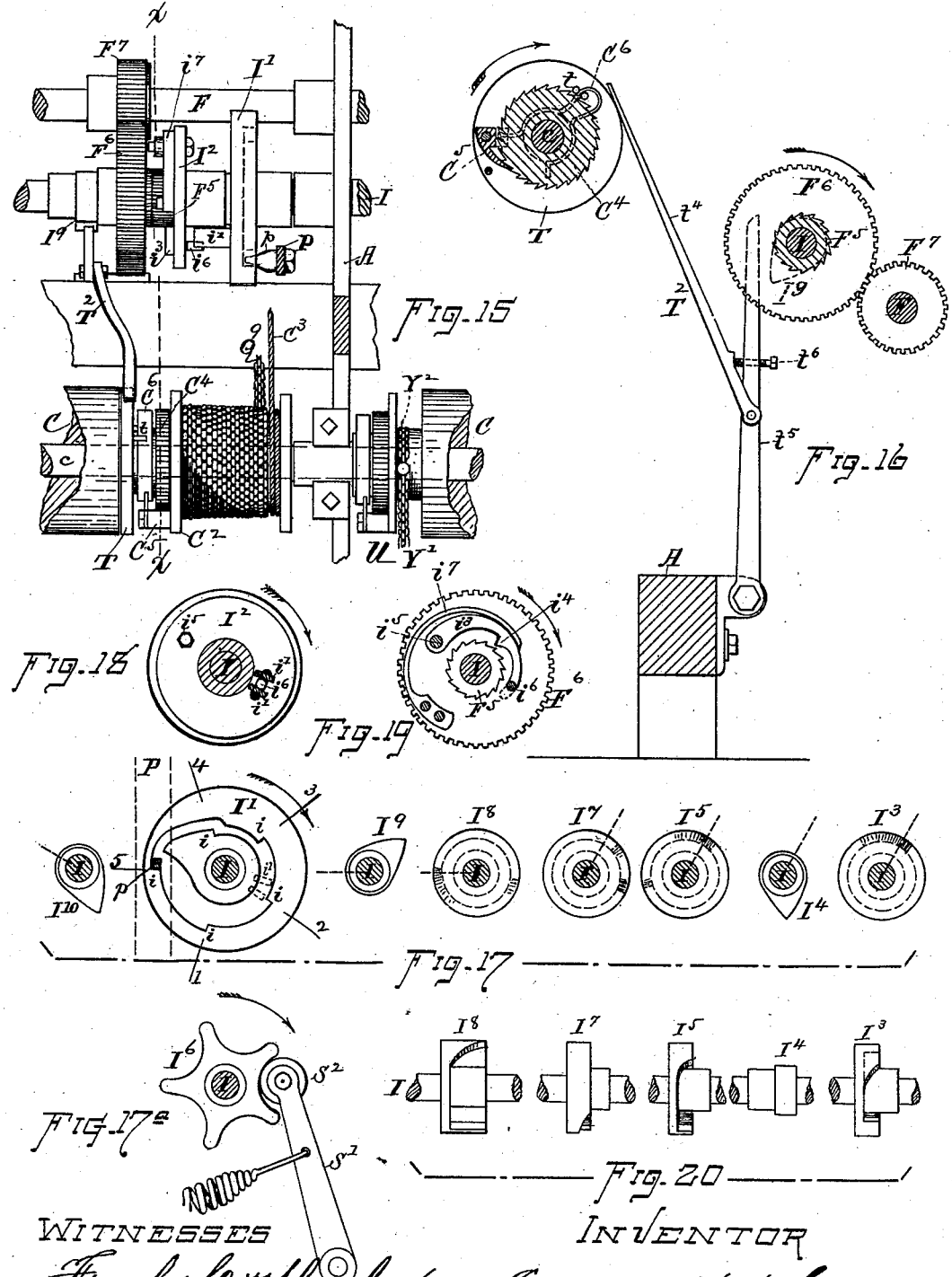

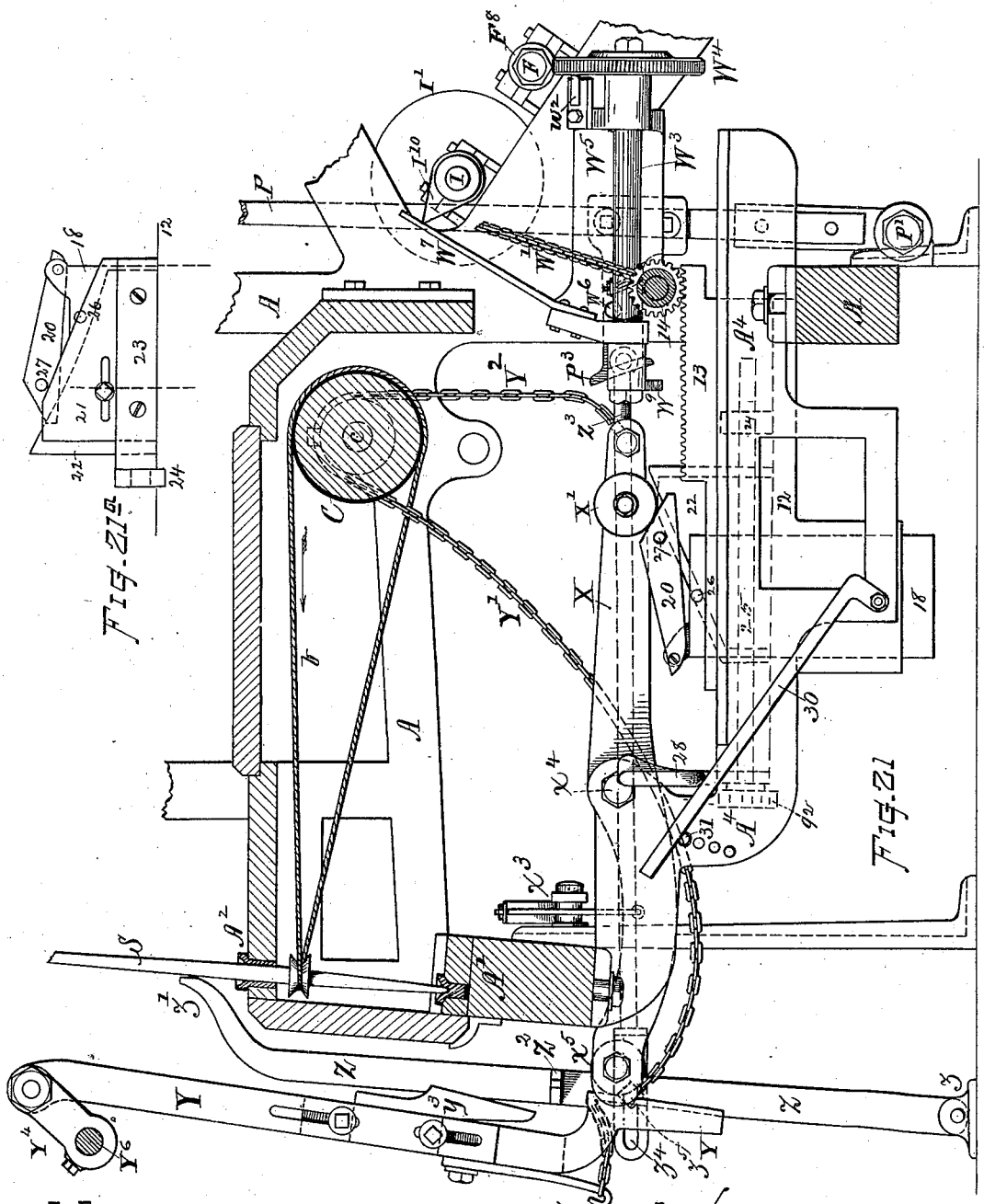

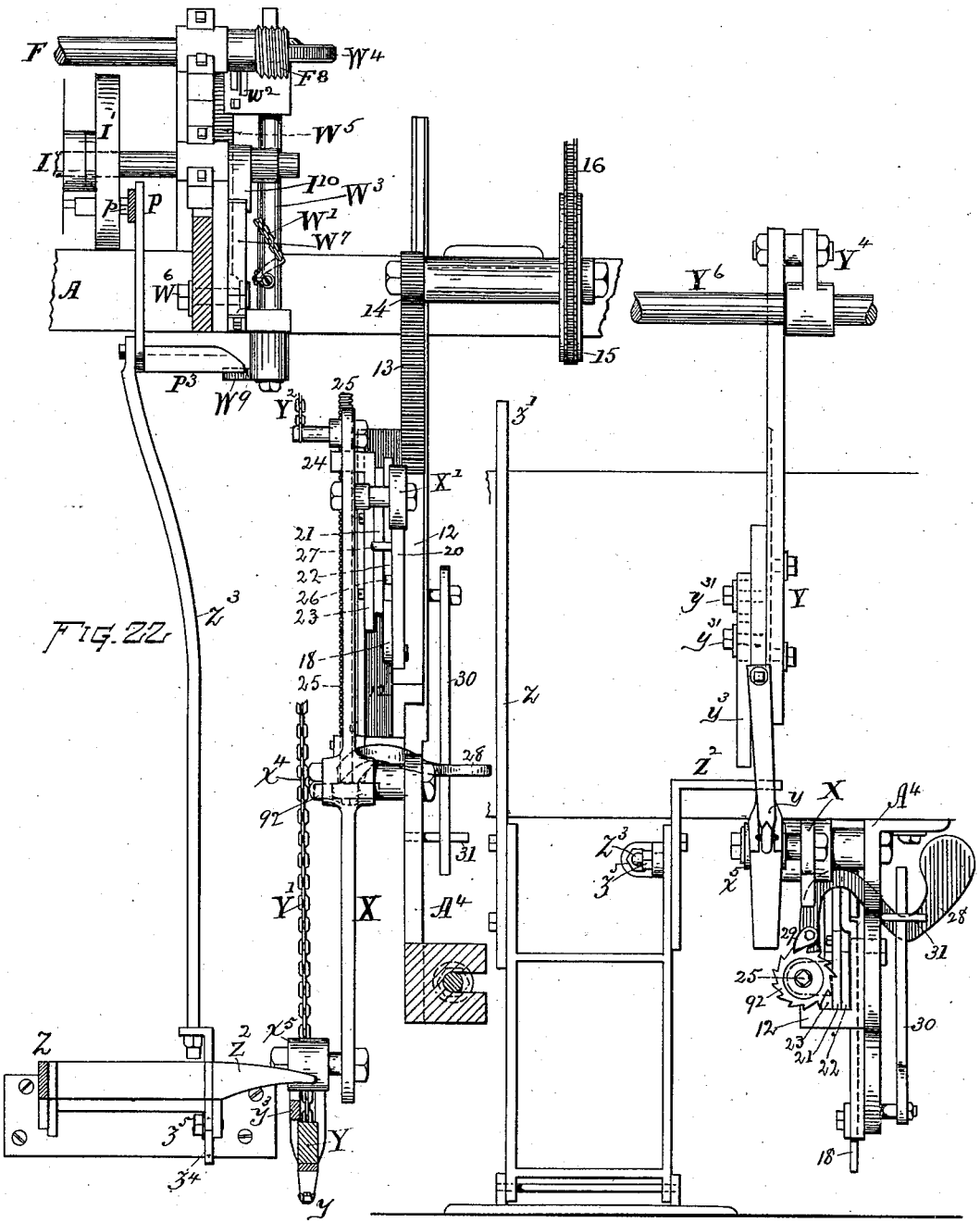

(No Model.) 10 Sheets—Sheet 10.
E. WRIGHT.
SPINNING MULE.
No. 370,840. Patented Oct. 4, 1887.
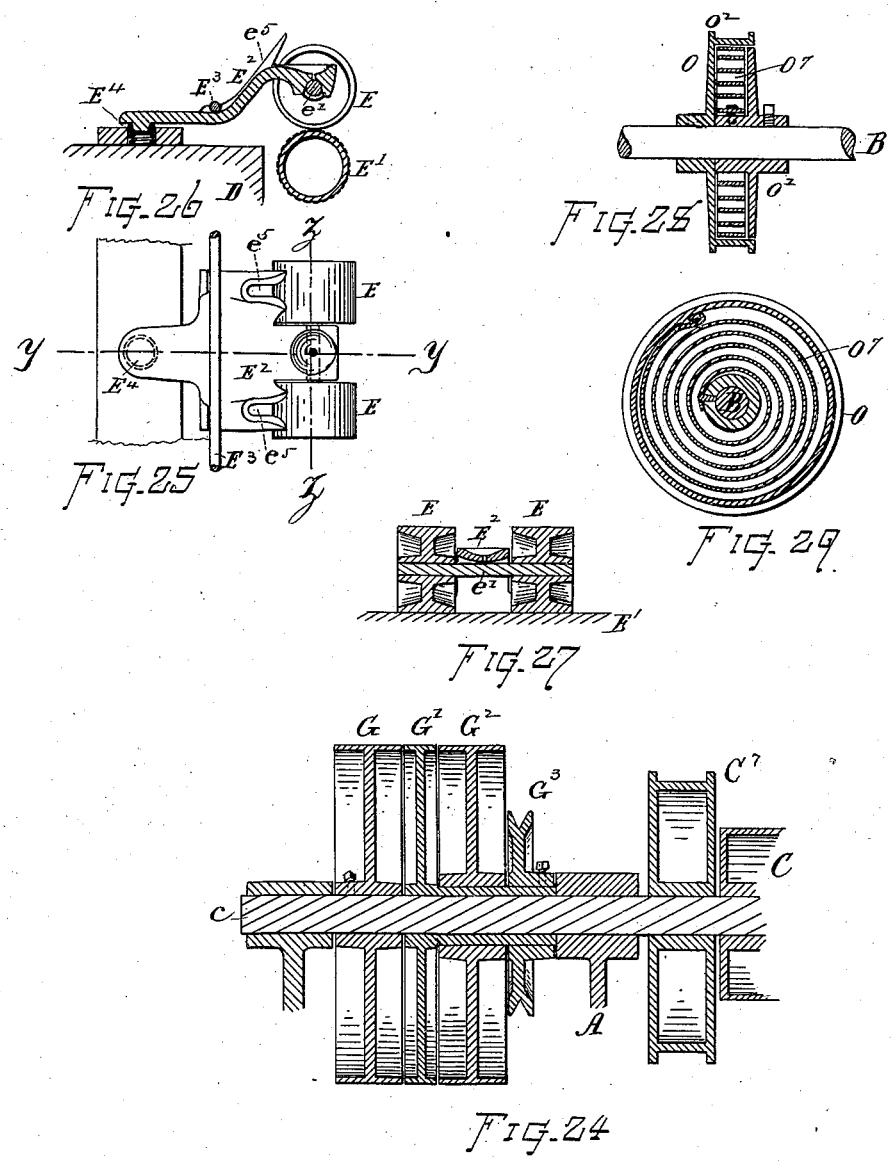
WITNESSES.
Frank L. Wheeler
Ella P. Blenus
INVENTOR.
Edward Wright,
By Chas. H. Burleigh
Attorney

UNITED STATES PATENT OFFICE.

EDWARD WRIGHT, OF WORCESTER, MASSACHUSETTS.

SPINNING-MULE.

SPECIFICATION forming part of Letters Patent No. 370,840, dated October 4, 1887.

Application filed October 4, 1886. Serial No. 215,204. (No model.)

*To all whom it may concern:*

Be it known that I, EDWARD WRIGHT, a citizen of the United States, residing at Worcester, in the county of Worcester and State of Massachusetts, have invented certain new and useful Improvements in Spinning-Mules, of which the following, together with the accompanying drawings, is a specification sufficiently full, clear, and exact to enable persons skilled in the art to which this invention appertains to make and use the same.

The object of my present invention is to provide an improved spinning-machine for spinning wool and similar fibrous material, which machine will operate practically and successfully at a higher rate of speed than machines at present in use, and which can be run with comparatively lighter power and attended with less labor and trouble; also, to render the machine more compact, so as to occupy less area of floor-space than the ordinary self-operating mules or jack-spinners, as compared on the proportional amount of work performed.

One part of my invention relates to the construction and combination, in a spinning-machine, of a set of spindles working at a stationary position, and a forwardly and backwardly moving carrier or roller-beam, upon which the roving-drums and roving-delivering rolls are supported, adapted to move toward and from the spindles, and means for effecting operation thereof, as hereinafter set forth.

Another part of my invention relates to the construction and manner of supporting and retaining the roving-guides and delivering-rolls, by means of a peculiar bearing-plate and holding devices, adapted for permitting a yielding and rocking action while confining the rolls in proper working relation.

A third part of my invention relates to the improved construction of scroll mechanism for operating the roller-beam in its movements toward and from the spindles, and for giving the peculiar variations and graduations of movement required for different kinds and qualities of stock, as more fully hereinafter set forth.

A fourth feature of my invention relates to the combination, with the scroll mechanism in a spinning-machine, of a yielding take-up or spring devices for compensating for the variations in the winding and unwinding of the scrolls in relation to each other, to prevent looseness of the ropes or backlash in the mechanism.

A fifth feature of my invention relates to the construction and manner of arranging the cam-shaft and its operating mechanism in combination therewith, as hereinafter explained.

A sixth part of my invention relates to the mechanism, in combination with the roller-beam, for actuating the cam-shaft escapement and for controlling and adjusting the delivery of the roving.

The seventh part of my invention relates to the arrangement of the quadrant and winding-chain mechanism in a manner to attain a triple action or increased movement of the chain and winding-drum, as hereinafter explained.

The eighth part of my invention relates to the combination, with the winding-drum, of a disk and brake device controlled or operated by the cam-shaft, for preventing engagement of the winding-drum pawl with its ratchet during the time that the backing-off mechanism is in action.

A ninth part of my invention relates to the construction and manner of arranging the mechanism for transmitting power from the operating-shaft to the cylinder for the backing-off action, as hereinafter explained.

The tenth part of my invention relates to an improved construction of the twist-wheel and easing-in mechanism, wherein a lever pressing against the roller-beam actuated by a chain or band that winds onto the twist-wheel shaft is employed.

The eleventh part of my invention relates to the combination, with the cop-builder arm, of an improved mechanism for controlling said arm in the formation of the base of the cop, the distinctive feature of which mechanism is the employment, in combination with a vertically-moving slide mounted on a reciprocating carrier and a short cop-forming block, the upper surface of which is shaped to give rise and fall to the arm hinged to the top of said slide, of gage-plates or movable inclines adapted for raising both the slide and its hinged cop-forming block under control of the cop-builder screw, as more fully hereinafter explained.

The twelfth part of my invention relates to an improved faller-trip mechanism operated in combination with the movable roller-beam and faller-lock bar for unlocking the fallers, and in connection with the escape-lever for letting off the escapement at the time for starting the indrawing scroll.

Other minor features of my invention will be understood from the drawings and following description, the particular subject-matter claimed being hereinafter definitely specified.

In the drawings, Figure 1 is a plan view of the operating-head of a spinning-machine constructed in accordance with my present invention. Fig. 2 is an end view of the machine. Fig. 2ª is a partial end view showing a modification in the mechanism for operating the roving-delivery rolls. Fig. 3 is a vertical section at line $u\ u$, Fig. 1, looking in the direction of the arrow on said line. Fig. 4 is a side, and Fig. 5 a plan, view showing in detail, on larger scale, the slide-bar for actuating the escape-lever. Fig. 6 is a plan view of the cam-shaft, operating-shaft, scroll mechanism, and parts connected therewith. Fig. 7 is a plan view of the back shaft and parts arranged thereon. Fig. 8 is a vertical section at line $v\ v$ in Fig. 1, for showing the draft-scroll, backing-off friction-wheels, and their connections with other parts. Fig. 9 is a sectional diagram showing the arrangement of the backing-off belt and its pulleys. Fig. 10 shows the manner of attaching the rope to the draft-scroll. Fig. 11 is an end view of the winding-wheel for the draft-scroll rope and its adjustable protuberant extensions. Figs. 11ª and 11ᵇ show other forms of protuberant extensions for interchange on the winding-wheel. Fig. 12 is a vertical section at line $w\ w$ in Fig. 1. Fig. 13 is a side view of the quadrant mechanism, with a section of the back shaft, roller-beam, and cylinder. Fig. 14 is a sectional plan of the quadrant mechanism. Fig. 15 is a sectional plan view of the winding-drum and escapement mechanism. Fig. 16 is a sectional detail view at line $x\ x$, Fig. 15, of the brake device, whereby the winding-drum pawl is held out of engagement when backing the cylinder. Fig. 17 shows the details, in end view, of the escapement-wheel and several cams of the cam-shaft. Fig. 17ª shows the star-wheel of the cam-shaft. Fig. 18 is a side view of the escapement-disk. Fig. 19 is a side view of the escapement-ratchet, gear, and pawl. Fig. 20 shows the side views of the cam-shaft cams. Fig. 21 is a vertical sectional view through the forward part of the machine at line $u\ u$, Fig. 1, on a larger scale than said figure, showing the cop-builder, twist-heel, and faller-lock mechanism. Fig. 21ª is a side view of the cop-builder gage-plates and their slide. Fig. 22 is a sectional plan view of the cop-builder and twist-wheel mechanism. Fig. 23 is a front view of the same. Fig. 24 is a central longitudinal section through the pulleys at the end of the cylinder-shaft. Fig. 25 is a plan view of one pair of the roving-delivery rolls and their supporting device. Fig. 26 is a vertical section of the same at line $y\ y$, Fig. 25. Fig. 27 is a longitudinal section at line $z\ z$, Fig. 25. Fig. 28 is a longitudinal section of the take-up spring and its drum on the back shaft, and Fig. 29 is a transverse section of the same.

Referring to parts, A denotes the main supporting-frame, composed of suitable upright castings, to which are secured the bearings for the back shaft, B, and cylinder C, which latter extend longitudinally throughout the length of the machine. The forward part of the frame, comprising the longitudinal step-girt A' and bolster-rail A², is stationary in position, and is boarded over, as indicated, to protect the lower part of the spindles S, the operating-bands $b$, and the cylinder C from accumulation of lint and waste.

At the top of the end and intermediate upright frames, A, I provide guideways $a$, preferably inclined downward toward the front of the machine, upon which guides there is supported a forwardly and backwardly moving roller beam or carrier, D, whereon the roving-drums D' are mounted, so as to be moved toward and from the spindles to give the stretch for spinning the yarn.

The roving-drums D' are arranged for supporting the roving-spools in the customary manner, being mounted on standards $d$, extending backward and upward from the rear part of the roller-beam D, while along the front part of said roller-beam are arranged the roving-delivering rolls E E', the devices for supporting the top rolls in which are constructed in the peculiar manner hereinafter described. The roller-beam is moved back and forth along the guides by means of bands or chains D², which are fixed to the under side of the beam, and which pass around sheaves or sprocket-wheels B', keyed on the shaft B, and guiding-sheaves S⁵, supported by suitable brackets, at a position a short distance at the rear of the spindles, so that revolution of the shaft B effects the movement of the roller-beam and parts connected therewith toward and from the spindles. The chains D² are arranged at intervals along the machine and serve to keep the roller-beam square, or parallel with the line of the spindles, as said roller-beam is moved back and forth.

The driving-pulleys are arranged directly upon the cylinder-shaft $c$, (see Figs. 1, 2, and 24,) and consist of four pulleys, G G' G² G³, the outer pulley, G, being keyed to the shaft, the second pulley, G', loose upon the shaft, and provided with a long tubular hub, to which hub the inner pulley, G³, is keyed, while the third pulley, G², is arranged to run loose upon said tubular hub, this latter acting as a loose pulley for the driving-belt when the machine is stopped. The inner pulley carries the belt F' for driving the operating-shaft F of the spinner-head, which shaft is provided with a pulley, F², as indicated in Fig. 2. Guide-pulleys F³ and F⁴ are provided to give the requisite length, and to facilitate taking up slackness of the belt, which can be done by adjusting one of said pulleys back and forth on the frame, its supporting-stud being fitted to a slot, F⁴¹, in the frame.

The operating-shaft F, cam-shaft I, and scrolls J and K are located at the lower back part of the machine, in the relative positions indicated in Figs. 1, 2, and 6, and supported in suitable bearings upon the frame.

The belt-shipper fork is attached to a bar, H, mounted in suitable bearings on the frame, and arranged to have longitudinal reciprocative action to carry the driving-belt to different positions on the face of the three pulleys G G' G². Said rod is moved in one direction by a spring, H², and in the other direction by a lever, H³, actuated by the cam I⁸ on the cam-shaft I. Said shipper-rod is also connected, by a suitable angle-lever, H⁴, and chain H⁵, with the shipper-rod $h$, along the front of the machine, so that the attendant can at any time throw the driving-belt onto the loose pulley G, by turning said rod when he desires to stop the machine.

The draft-scroll J is supported to run loose on its shaft J', and is connected thereto for operation by a clutch, J², thrown into and out of action by means of a lever, J³, actuated by a cam, I⁵, on the cam shaft, and a suitable spring, J³¹, connected with the lever. Motion is transmitted to the shaft J' by a train of gears, J⁴ J⁵, from the operating-shaft F. (See Fig. 6.) The band or rope J⁶ of the draft-scroll J extends to and is attached to a winding-wheel or auxiliary scroll, M, fixed on the back shaft, B, which shaft is operated in one direction for moving the roller-beam from the spindles toward the rear of the machine by rotation of said draft-scroll. The draft-scroll J is made with an overhanging peripheral rim, through which holes J⁷ are formed at short intervals, and the end of the rope is provided with a hook or a screw-clip, J⁸, whereby it can be conveniently attached and detached for adjusting it to different positions about the periphery of the scroll, and thus varying the draft as may be desired. To vary the draft to accommodate the requirements of different grades of stock, the attaching device at the end of the rope is changed to different position on the periphery of the scroll, thus giving a slightly-different speed and movement to the roller-beam D by causing the rope to wind onto the lesser or greater circles of the scroll. The winding-wheel M or auxiliary scroll is constructed with protuberant extensions $m$ and $m'$ at the ends, whereby the surface on which the rope winds is extended to a greater distance from the axis, thus increasing the radius or leverage, so that the rope draws through a longer arc, and thereby causes, in case of the extension $m$, a retarded action on the movement of the roller-beam at the latter part of the stretch. The forward extension, $m'$, is made separable from the other part of the wheel, and is connected therewith by means of the attaching-bolts $m^{10}$, passing through slots $m^{11}$, in such a manner that it can be adjusted to different positions about the peripheral circle, or detached from the wheel and interchanged for protuberant extensions of different size, extension, shape, or curvature. The purpose of the forward extension, $m'$, is to start the roller-beam away from the spindles by a slow and easy accelererated motion, so as not to strain the partially-spun yarn, and to avoid breaking down the ends.

Modifications of the extension-piece are shown in Figs. 11ᵃ and 11ᵇ, adapted for imparting different qualities of movement to the back-shaft roving-beam.

The indrawing-scroll K is loose upon its shaft K', and is provided with a clutch, K², for throwing it into and out of action, operated by a lever, K³, under control of the cam I⁷ on the shaft I, and with a spring, K⁴, for throwing in the clutch when the lever is released. The rope or band K⁵ from the indrawing-scroll extends to and is attached to the periphery of the winding-wheel N, fixed on the back shaft, B, which shaft is operated by the rotation of said indrawing-scroll in a direction opposite to that in which it is moved by the draft-scroll, thus effecting movement of the roller-beam D and spools of roving from the back of the machine toward the spindles.

Connected with the scrolls I employ a spring take-up to compensate for the difference in movement between the winding and unwinding of the respective scrolls, so as to keep the ropes taut at all times and to avoid backlash in the mechanism. Said spring take-up is preferably constructed and arranged in the following manner: A drum or barrel, O, (see Figs. 28, 29,) is mounted on the shaft B, which drum is composed of two parts—viz., a hub and disk, O', which is fixed or keyed to the shaft B, and a rim and supporting-disk, O², mounted loosely on said shaft B. Between these parts is confined a flat, volute, or coil spring, O⁷, one end of which is attached to the hub, the part O', while the other end of said spring is attached to the rim or part O². A strap, band, or chain, O³, extends from the drum O to the hub of the scroll, or a wheel, O⁴, fixed thereon, the ends of the strap being respectively secured to and wound onto said drum in such manner that the strain of the spring will tend to rotate the scroll in a direction opposite to the pull of the scroll-rope, thus keeping the rope pulled taut at all times. A similar take-up mechanism, O⁵, is employed for each of the scrolls J and K, and also for rewinding the quadrant-chain. The two latter take-up devices are indicated on the drawings at O⁵ and O⁶. (See Fig. 7.)

The spring-drums O and O⁵ being mounted on the back shaft, B, which is operated by the scrolls J and K, it will be noticed that the springs are only uncoiled to an extent equal to the variations between the actions of the two scrolls J and K in winding and unwinding, since the rotation of the shaft B accommodates the balance of the movement, and the straps wind and unwind with the movement of the scrolls; hence the springs are not strained to any great extent.

The cam-shaft I is mounted to turn in suitable bearings near the operating-shaft F, and is provided with an escapement-wheel, I', having five stops, which works in connection with the let-off ratchet mechanism I², operating-gears F⁶ F⁷, and escape-lever to partially rotate said cam-shaft at intervals, as required. A series of cams, I³, I⁴, I⁵, I⁷, I⁸, I⁹, and I¹⁰, are mounted upon said cam-shaft I for throwing into and out of operation the various parts of the mechanism at the proper times. A star-wheel, I⁶, is fixed on the shaft I, and a presser-bar, S', is combined therewith to hold the shaft, cams, and escapement from moving out of place, except when worked by the escapement. The escapement-wheel, cams, and star-wheel are illustrated in detail in Figs. 16 to 20, inclusive. Said escapement-wheel I' and its ratchet mechanism are constructed as follows:

The escapement-wheel I' is mounted loose on the shaft I. On one side said wheel is provided with a groove having five shoulders or offsets, $i$, to engage with the stop-stud $p$ on the escape-lever P, and on the opposite side it has two lugs, $i'$. A disk, I², is fixed tight upon the shaft adjacent to the escapement-wheel, and upon said disk there is supported a pawl, $i^3$, having a centrally-located tooth, $i^4$, that engages with the teeth of a ratchet-wheel, F⁵, fixed to the side of a gear, F⁶, that runs loose upon the shaft I and meshes with and receives motion from a pinion, F⁷, fixed on the operating-shaft F. The head of the pawl $i^3$ is pivoted to the disk at $i^5$, and its tail $i^6$ projects laterally through a slot in the disk and is confined between the lugs $i'$ on the escapement-wheel. A spring, $i^7$, is attached to the disk, and presses against the back of the pawl $i^3$, to force the tooth $i^4$ into the ratchet. When the escape-lever P is moved, so as to release its stud $p$ from the shoulder of the escapement-wheel, the spring $i^7$ presses forward the pawl $i^3$, causing its tooth to engage with the ratchet which is constantly revolving with the operating-gear F⁶, and motion is transmitted through the pawl and disk to change the position of the cam-shaft, which moves one-fifth of a revolution, or until another shoulder of the escapement-wheel strikes the stud $p$ of the escape-lever. This stops the movement of the wheel I', and the lugs $i'$, acting against the tail of the pawl, forces the tooth of the pawl from the ratchet, and thus allows the ratchet to revolve without moving the cam-shaft I until the stud of the escape-lever is again thrown from a shoulder of the wheel I', when another one-fifth revolution of the cam-shaft is effected.

The shaft I and disk I² are pressed forward in the direction of rotation, so as to prevent the parts from turning back and allowing the pawl to catch the ratchet by means of the spring-actuated arm S', provided with a roll, S², that presses forward the points of the star-wheel I⁶, substantially in the manner as heretofore employed.

I do not claim novelty in the employment of an intermittently-rotating cam-shaft for controlling the stopping and starting of mechanisms in a spinning-machine; but, as herein employed, the escapement mechanism for effecting the stopping and starting of the cam-shaft is of improved construction, and is adapted for giving five stops or intervals in the revolution of the shaft.

Upon the end of the scroll-shaft J' there is mounted a sprocket-wheel, L, and clutch L', from which the roving-delivering mechanism is operated. Said clutch L' is thrown into and out of action by means of a lever, L², controlled by a cam, I³, on the cam-shaft I. (See Fig. 6.) The sprocket-wheel L is connected, by a chain, $l$, with a sprocket-wheel, $d^2$, mounted on the end of the roller-beam. Said chain passes around guide-pulleys, sheaves, or sprockets $l' l^2 l^3$, supported on studs fixed to the frame A, and guide-pulleys $l^4$ and $l^5$, mounted on studs fixed to the roller-beam D, the parts being disposed substantially as shown in Fig. 2, or so that the sprocket $d^2$ will be operated by the action of the chain $l$ at whatever position the roller-beam may occupy along the stretch. The guide-pulley $l^3$ is made adjustable for taking up the slack of the chain $l$ by having its stud clamped in a slot, $l^{31}$, in the frame A. The sprocket $d^2$ is provided with a gear fixed to the side thereof, which gear meshes with an intermediate gear, $d'$, that in turn meshes with the gear $e$, that revolves the roving-delivering rolls E E'. The gear $e$ is fixed to the end of the lower roll, E', which roll or the shaft thereof extends the length of the machine, being coupled together in sections.

The sprocket-wheel L and the sprockets and gearing $d^2$, $d'$, and $e$, at the end of the roller-beam, for driving the delivering-rolls may be formed of different relative size and arrangement from that herein shown, or changed for attaining different speeds of said delivering-rolls, as desired; also, if desired, the chain $l$ may be made in two parts, instead of one continuous length, the portion extending from the lower part to the upper part of the machine being formed in a separate piece or band from that portion which extends from the rear part of the machine to the front. In this case a double sprocket would be used in place of the wheel $l'$, one part of said sprocket carrying the upright portion of the chain or band and the other part of said sprocket carrying the horizontal portion of the chain or band. This arrangement is indicated by dotted lines in Fig. 2.

In the operation of the rolls E, the movement of the roller-beam is in opposite direction to the movement of the chain $l$ while the roving is being delivered—that is, when the roller-beam is moving away from the spindles. Therefore one-half of the movement and speed, or substantially so, required for the rolls E is obtained from the movement of the roving-carrier or roller-beam. Consequently the delivery of roving is partially under control of the draft-scroll, and its speed of delivery is thereby proportioned to the speed of the backward movement of the roller-beam, and partially under control of the chain $l$, running at the uniform speed of the machine; hence a slight excess of roving is delivered beyond the amount of movement of the carrier or roller-beam, to compensate for what is taken up by the twisting during the time the rolls E are turning.

As a modification in the construction of the roll-driving mechanism, in lieu of extending the chain $l$ to the front of the machine, said chain may be arranged to drive a bevel-gear, $L^5$, at the rear, and a splined shaft, $L^6$, be arranged across the ends of the machine and connected with said beveled gear for its rotation. A beveled gear, $L^7$, is then used to mesh with the roll-gear $e$, the hub of which beveled gear is arranged to traverse along and be operated by the splined shaft as the roller-beam moves back and forth. Such a modification is illustrated in Fig. $2^a$ of the drawings. A rotary movement of said shaft is transmitted to the rolls through the beveled gears $L^7$ and $e$, thus giving an action to the rolls equivalent to that obtained with the use of the chain in the manner above specified.

The working portion of the under roll, $E'$, or that part on which the top rolls rest, is longitudinally fluted with grooves and ridges about one-sixteenth of an inch apart, while the top rolls, E, are made with a plain surface and are mounted in pairs in a manner capable of a rocking and yielding action. This construction permits of the delivery-rolls readily and surely carrying through any small hard substances that may be in the roving, which would otherwise naturally choke the rolls and break down the strands of roving.

The bottom roll is preferably formed hollow, as indicated in Fig. 26, and may be made of ordinary steam-pipe tubing properly dressed off on the surface, and journals of solid bar metal may, if desired, be employed at the ends of the tubular sections, where the roll takes its bearings upon the frame.

The top rolls are constructed and supported as shown in detail in Figs. 25, 26, and 27. Said rolls are coupled in pairs by a short axial shaft, $e'$, and each pair is held in position by a bearing-plate, $E^2$, in the manner indicated. The central part of said bearing-plate is locked under a fulcrum-bar, $E^3$, fixed to the top of the roller-beam D, and said plate is provided with a transverse groove or lugs, whereby it is retained in proper relation thereto. The head or front end of the plate is provided with a groove which embraces the axial shaft $e'$ of the rolls, while the rear end of said plate rests on a spring, $E^4$, which spring forces upward the rear end of the plate, causing the forward end to press the top roll down upon the bottom roll. At the sides of the plate are formed slots or spaces $e^5$, which serve as guides for directing the strands of roving centrally to the bite of the rolls. The roving guides or slots may be open at the top or side for the convenient introduction of the strand of roving. The recess in the head of the plate for the roll-shaft is longitudinally rounded at its upper part to allow rocking action of the rolls without rocking the bearing-plate.

The cam-shaft escapement-wheel $I'$, having five stops or escapement-intervals, as hereinbefore stated, engages with the stud $p$ of the escape-lever P. Said lever, which is arranged in upright position, is pivoted at $P'$ near the floor, and extends up to the top of the frame, where it connects with a longitudinally-movable bar or slide, R, arranged parallel with the guideway $a$, and provided at its ends with lugs $r\ r'$, (adjustable, as indicated in Figs. 3, 4, and 5,) that engage the roller-beam at the forward and backward limits of its action, so that the said bar and the escape-lever will be moved as the roller-beam is brought in contact with either the forward or rearward lug, and the cam-shaft escapement thereby released for changing the position of the cams and bringing into action different parts of the mechanism at the proper time.

At an intermediate position upon the slide-bar R, I arrange a finger or small angle-lever, $R'$, pivoted upon the side of said bar, with its lower arm engaging with a slotted block, $R^2$, secured to a supporting-bar, $R^3$, fixed to the forward frame. When the slide-bar R is at forward position, the rear end of the finger $R'$ projects above the top of said slide, and in the backward movement of the roller-beam said finger is depressed by the beam passing over it, which action moves the slide R and escapement-lever P, letting off one step in the cam-shaft action. The purpose of this finger and the action instigated thereby is to throw out the clutch mechanism $L'$ and stop the delivery of roving. A series of holes, $r^5$, are formed in the slide R, and the pivoting-stud $r^4$ of the lever can be set in either of said holes to adjust the lever to accommodate a long or short delivery of roving, the block $R^2$ being correspondingly adjusted along the bar $R^3$ by loosening its set-screw $r^7$ and sliding it thereon to the position desired.

The quadrant mechanism is arranged at the rear part of the frame and is constructed as shown in detail in Figs. 13, 14, and 15. The quadrant-arm Q, which is provided with a screw, $q$, for moving the nut along the arm in the ordinary manner, is mounted upon a gear, or segment of a gear, $Q^2$, which is fixed on the end of a sleeve or hollow shaft, $Q^3$, supported in suitable bearing on the frame A, (see Fig. 14,) and operated by a pinion, $B^3$, on the back shaft, B, so as to swing the quadrant-arm forward and back. Passing through the sleeve $Q^3$ is a short shaft, $Q^4$, on one end of which is a bevel-gear, $g^{21}$, that meshes with the gear $g^{22}$ on the quadrant-screw $q$, and upon its other end a clutch, $Q^5$, and sprocket-wheel $Q^6$, actuated by a chain-band, $Q^7$, which runs from the sprocket-wheel $B^4$ on the back shaft, B. The quadrant-clutch $Q^5$ is thrown into action by means of the fork $f$ on the end of a rocker-shaft, $f'$, the opposite end of which is provided with an arm or crank connected by a rod, $f^2$, with an angle-lever, $f^3$, that is actuated by the drop-weight $f^4$, connected with the faller mechanism. When the under faller is drawn down below its proper level by the strain on the yarn, the weight $f^4$ presses down the lever $f^3$, and thereby effects the throwing in of the clutch $Q^5$, causing the nut or chain connection piece $Q'$ to be run out along the quadrant-arm Q by the screw $q$. If preferred, in lieu of the shaft $f'$, rod $f^2$, and angle-lever $f^3$, the connections for throwing in the quadrant-clutch $Q^5$ may be arranged in any convenient manner.

Pivoted to the nut or slide on the quadrant-arm is a swinging piece, $Q'$, in which is a sheave, $Q^8$. The quadrant-chain $Q^9$, which leads to the drum $C^2$ on the cylinder-shaft, has its end connected to the swinging piece $Q'$, thence passes forward around the sheave $D^4$, mounted on a forwardly-extending arm, $D^5$, fixed to the roller-beam D, thence back and around the sheave $Q^8$, then to the drum $C^2$, to which the other end of the chain is attached. By this peculiar arrangement of the chain I obtain a triple action or multiplied movement and avoid the necessity of using gears for increasing the movement of the winding-drum $C^2$.

No novelty is claimed in the use of the quadrant, the features of my present improvement being the improved arrangement of the chain and its connections, in combination with a quadrant, movable roller-beam, and winding-drum, whereby the triple action is obtained.

The drum $C^2$ is furnished with a take-up for preventing slack in the chain, which take-up consists of the spring mechanism $O^6$ on the back shaft, similar to that above described for the scroll J, and a cord or band, $C^3$, connecting the drum $C^2$ with said spring-drum $O^6$ to draw the drum in a direction opposite to the pull of the chain. In the present instance the take-up band is shown passing around the guide-pulley near the floor; but such band might be arranged to lead direct from the winding-drum to the spring-drum, if preferred, the guide-pulley being omitted. The winding-drum $C^2$ is mounted to run loose on the cylinder-shaft. At its end is a ratchet-wheel, $C^4$, keyed to the shaft, and a pawl, $C^5$, for engaging said ratchet, is pivoted to the end of the drum and provided with a spring, $C^6$, of the form indicated, which embraces a cylindrical hub on the ratchet-wheel and acts to throw the pawl in or out, according to the direction of relative movement between the drum and ratchet. (See Figs. 15 and 16.)

The drum $C^2$, ratchet $C^4$, pawl $C^5$, and spring $C^6$ are similar in construction and action to those heretofore employed. In combination with these parts, I employ a disk, T, mounted loose upon the cylinder-shaft adjacent to the ratchet-wheel, and provided with pins or lugs $t$, that embrace the projecting loop of the spring. A brake-lever, $T^2$, is arranged to press upon the periphery of the disk, under control of the cam $I^9$ upon the cam-shaft I, for retarding the movement of said disk during the time of the backing-off action; hence while the cylinder is making this backing action the brake and disk, acting upon the spring $C^6$ and pawl $C^5$, serve to hold the pawl out of engagement with the ratchet, so that the backing-off mechanism can revolve the cylinder C in a reverse direction without affecting the winding-drum, while it effects the immediate throwing in of the pawl to engage the ratchet the instant that the backing-off mechanism ceases to act, and draft upon the quadrant chain, which is attached to the winding-drum, commences. The brake-lever $T^2$ may be made in a single piece, or, if preferred, may be made in two parts, $t^4$ and $t^5$, and provided with a screw, $t^6$, so as to be adjustable, as shown in Fig. 16.

The drum, pawl, and ratchet, at U, for bringing the faller mechanism into position, are constructed to operate in the ordinary manner.

For imparting motion from the operating-shaft to the cylinder, when backing off, I employ a friction-wheel, V, mounted in a swinging bracket, $V'$, suspended from a stud, $V^2$, parallel with the cylinder. The shaft of the friction-wheel is provided with a pulley, $V^3$, which is connected by a short belt, $V^4$, with a pulley, $C^7$, on the cylinder-shaft. The rim of the friction-wheel V is beveled on either side, and is arranged to swing into contact and engagement with a friction-wheel, $V^5$, mounted on the operating-shaft F, and having a V-shaped groove about its periphery, into which the rim of the friction-wheel fits. An arm, $V^6$, is attached to the swinging bracket, which engages with a cam, $I^4$, on the cam-shaft I, for swinging the friction-wheel into engagement at the proper time. Said arm is provided with an adjusting-screw, $V^7$, whereby the parts can be adjusted for giving frictional pressure between the wheels V and $V^5$. When the wheels V and $V^5$ are brought into contact, motion is transmitted from the operating-shaft F through the wheel V and belt $V^4$ and pulleys $V^3$ and $C^7$ for rotating the cylinder and spindles in a backward direction. The frictional surfaces of the wheels V and $V^5$ may be faced with leather or other suitable material, so as to give a high degree of friction.

For easing-in the roller-beam to compensate for the shortening of the yarn by twisting, I employ a lever, W, fulcrumed near the floor, with its top end extending up in rear of the roller-beam, in position to be engaged thereby when said roller-beam is run back. A chain, $W'$, is connected with said lever W, which passes to and is connected to the axle or shaft $W^3$ of the twist-wheel $W^4$, so as to be wound up by said twist-wheel for drawing the lever forward during the time the yarn is twisted. The twist-wheel is mounted on a swinging bracket, W⁵, pivoted to the lower part of the frame A by the stud W⁶, and is rotated by a worm, F³, on the end of the operating-shaft F, against which it is held by means of a lever, W⁷, attached to the bearing-bracket, which lever is pressed up by a cam, I¹⁰, on the cam-shaft I during the time the twist-wheel is in operation. The twist-wheel drops from the worm by its own gravity, when the cam I¹⁰ releases the lever W⁷, and said twist-wheel is rotated back to starting position by the unwinding of the chain W', which is effected by the action of the counterbalance-weight W⁸, attached to an arm of the lever W in a manner to swing it backward in opposition to the draft of the chain. A spring could, if desired, be used for pressing back the lever; but I prefer a weight, as herein shown. The twist-wheel is provided with a pin, w², for stopping its return motion at the proper position, which pin is interchangable to any one of a series of holes formed in the wheel for gaging the amount of twist put into the yarn in the customary manner, the easing-in being proportioned to the amount of twist, as the chain is more or less wound up accordingly as the twist-wheel revolves a greater or less distance from the point of starting. A series of holes are formed in the lever W, to permit of the chain being attached thereto at a higher or lower position, so as to give the lever a longer or shorter swing in proportion to the amount of chain wound up by a given movement of the twist-wheel, thus adapting the mechanism for ready adjustment of the easing-in movement, so that it will compensate for the shortening of the stretch by the twisting of the yarn in different qualities of stock, some of which shortens more than others by twisting. The easing mechanism, consisting of a lever and chain winding onto the twist-wheel axle, may be used for easing-in the carriage on spinning-machines of other construction than that herein shown, and I desire to include such use as within the scope of my present claim.

On the forward end of the twist-wheel shaft I arrange a cam or finger, W⁹, which revolves into contact with an inclined lug or surface, P³, on a bracket or arm connected with the escapement-lever, and whereby said lever is moved to throw it off the escapement-stop and permit the change of position of the cam-shaft, when sufficient twist has been given the yarn.

In my cop-builder mechanism the cop-builder arm X is constructed and connected in the manner substantially as heretofore employed.

The faller-lock chain Y' and the regulating-chain Y² are attached to the backing-off clutch on the cylinder, the former passing to the faller-lock for drawing it down beneath the roll at the front end of the cop builder lever, and the latter connected to the rear end of said lever. Beneath the rear end of the lever, and mounted on a suitable support or frame, A⁴, is a reciprocating carrier, 12, provided with a rack, 13, which meshes with a pinion, 14, on the end of a short shaft, having on its opposite end a sprocket-wheel, 15, which is driven by a chain, 16, from a sprocket-wheel, 17, on the back shaft, B. Supported in the carrier there is a vertically-moving slide, 18, to the upper front corner of which the cop-forming block 20 is hinged in a manner to permit of its rear end being raised and depressed. Said cop-forming block is made some six inches (more or less) in length, and its upper surface is inclined upward at either end, as indicated, the inclination being such as required to raise and depress the roll X' and rear end of the lever X for imparting to the fallers Y⁶ the proper action for winding the yarn onto the cop with the suitable taper.

Supported on the carrier 12, side by side with each other, are two wedges or inclined gage-plates, 21 and 22, which gage-plates are attached to a shoe, 23, guided upon the carrier 12, carrying a nut, 24, that works on the cop-builder screw 25, the gage-plates being thereby supported in upright position to be moved longitudinally along the carrier. The vertically-moving slide 18 is provided with a stud or pin, 26, that rests upon the inclined top of the gage-plate 22. The cop-forming block 20 is provided with a pin or lug, 27, that rests on the inclined top of the gage-plate 21. The gage-plates 21 and 22, or one of them, is slotted, so that it can be adjusted longitudinally in relation to the other to vary the relative action between the slide 18 and the cop-forming block 20. The top of the gage-plate 21 is cut away level, or substantially so, at one end of the incline, so that the lug of the cop-forming block will, at the commencement of the cop, rest at a given height, while the slide carrying the forward end of the forming-block moves downward to compensate for the winding in of the cop at the base of the bobbin before the full form is completed, after which the ends move down the inclines of the gage-plates uniformly, or substantially so, with each other. The gage-plates 21 and 22 are moved longitudinally along the carrier by means of the cop-builder screw 25. Said screw is operated by a lever, 28, which swings on the axis of the screw, and carries a pawl, 29, that engages a ratchet-wheel, 92, fixed on the end of the screw, and rotates the screw as the lever is raised and depressed by running onto an inclined guide-bar, 30, with the reciprocating movement of the carrier. The bar 30 is pivoted at its rear end, and its front end is supported by a stud, 31, set into the side of the frame. A series of holes are formed in the frame for the stud 31, into either of which the stud can be inserted for supporting the bar 30 at greater or less inclination, so as to give more or less movement to the lever 28 and the cop-builder screw 25, as required.

$x^3$ indicates a spring device for raising the forward end of the lever X, and pressing the roll X' down upon the former-block 20. Said lever X is fulcrumed, as at $x^4$, on the part of the frame A⁴ which supports the carrier whereon the cop-builder mechanism is mounted, and its forward end is provided with a roll, $x^5$, beneath which the faller-lock Y hooks when the chain Y' is wound up by the backing-off action. The chain Y' passes beneath the roll $x^5$, then through the faller-lock bar Y, and connects with the spring $y$, fixed on said bar in the ordinary manner. The upper end of the bar Y is pivoted to an arm or crank fixed on one of the faller-rods, and the fallers are constructed and arranged to operate in the common well-known manner.

Z indicates a tripping-lever pivoted or fulcrumed to a suitable eye-block, $z$, on the floor, and extending upward at the front of the machine, with its top end, $z'$, in position to engage with the roller-beam D, or an arm, $D^5$, attached thereto, whereby the lever will be swung forward when the roller-beam approaches the spindles S. The lower part of the lever is made with two sides connected by cross-bars to give lightness and strength in construction. Said lever is provided with a lateral arm, $Z^2$, that passes behind the faller-lock bar Y and serves to throw the faller-lock out of engagement with the roll $x^5$ of the cop-builder lever X when the roller-beam D or its arm $D^5$ acts against the lever Z. A tapered adjustable striking-piece, $y^3$, is fixed, by means of bolts $y^{31}$, that pass through slots, as indicated in Fig. 23, on the faller-lock, against which the arm $Z^2$ works, and by means of which adjustment is attained for releasing the lock at the proper instant of time.

A rod, $Z^3$, connects the tripping-lever Z with the escapement-lever P. The forward end of said rod has a longitudinal slot, $z^4$, and is attached to said trip-lever by a stud, $z^5$, that runs in the slot, so that the lever Z can swing forward without actuating the rod, but will press back said rod when the faller-lock is drawn back against it by the chain Y' at the last extent of its backward movement, and thereby throws off the escapement and permits a change of position of the cam-shaft for bringing into action the indrawing-scroll and stopping the backing-off action.

The operation of my improved spinning-machine is as follows: Commencing with the roller-beam and rolling-drums at a position near the spindles and just starting for spinning a stretch. The cam-shaft and escapement are then at the position as indicated in Figs. 17 to 20. The driving-belt at this time is on the first pulley, G, and the second pulley, G', thus operating the cylinder and spindles and also the operating-shaft F, which operating-shaft runs during the entire operation, except when the machine is stopped by shifting the belt onto the loose pulley $G^2$. The clutch $J^2$ of the draft-scroll J is in mesh for action, and also the clutch L', driving the mechanism whereby the roving is delivered. Now, as the roller-beam D moves backward, the roving is paid out by the delivery-rolls until the beam D comes in contact with and depresses the lever or finger R', which action moves the bar R and escapement-lever P, throwing the stud $p$ of the lever from the shoulder of the escapement-wheel and permitting the first change in the position of the cam-shaft. At this change the cam $I^3$ on the cam-shaft throws out the clutch L', and thus stops the delivery of the roving. When the carrier or roller-beam D reaches its backward limit of action, it engages the lug $r$ at the rear end of the slide-bar R, and by moving said bar and the lever P again trips the escapement, allowing the cam-shaft to make its second change of position. At this time the cam $I^5$ releases the clutch $J^2$, thus throwing the draft-scroll out of action. The cam $I^{10}$ raises the twist-wheel into mesh with the worm on the operating-shaft, thus bringing the easing-in mechanism into action. The machine then runs on until sufficient twist has been imparted to the yarn, when the cam $W^9$, striking the incline bracket, moves back the escape-lever, releasing the escapement and permitting the third change in the position of the cam-shaft. At this third change the cam $I^{10}$ swings off from the lever $W^7$ and the twist-wheel drops from the worm $F^8$ and is turned back to place by the unwinding of the chain W'. At the same time the cam $I^8$ operates the shipper $h$ to shift the driving-belt from the pulley G, so that it will run on the pulley $G^2$, while at the same time the cam $I^4$ swings the friction-wheel V into engagement with the wheel $V^5$ for turning the cylinder backward or backing off the spindles; also at the same time the cam $I^9$ forces the friction-brake $T^2$ against the periphery of the disk T for holding out the winding-drum clutch during the back-off action. It will be understood that the driving-belt at all times runs upon and operates the pulley G', and that in shifting from pulley G to pulley $G^2$ the belt is moved across said central pulley, G', so that its edge will lap onto either one or the other of the two pulleys G or $G^2$, while at the same time embracing pulley G'. The backward rotation of the cylinder, effected by the friction-wheels V $V^5$ and their connections, winds up the faller-lock chain Y', drawing the faller-lock Y beneath the roll $x^5$ of the cop-builder arm X, and said faller-lock, as it comes into position, presses back the arm $Z^2$ of the trip-lever Z, which movement also acts, through the rod $Z^3$, upon the escape-lever to release the escapement and effect the fourth change of position of the cam-shaft. At this fourth change the cam $I^9$ releases the brake $T^2$. The cam $I^7$, through the lever $K^3$, throws in the clutch $K^2$ of the indrawing-scroll K, by which the back shaft is operated to move forward the roller-beam; also at the same time the cam $I^4$ throws out the friction-wheel V, stopping the backing-off action. As the roller-beam moves forward, the chain $Q^9$ is unwound from the winding-drum and the cylinder and spindles are revolved by said winding-drum for winding the yarn upon the bobbins. The form of winding on is controlled by the cop-builder mechanism acting through the faller-lock bar and fallers in a general way, substantially as in other spinning-machines of this class. When the roller-beam reaches its forward position, the arm $D^5$ strikes the trip-lever Z, and the arm $Z^2$ of said lever throws off the faller-lock from the roll $X^5$, and the roller-beam at the same time engages the lug $r'$ at the forward end of the slide-bar R, moves forward said bar, swinging the escapement-lever from the last or inner shoulder of the escapement-wheel, and permits the fifth change in the position of the cam-shaft, bringing said cam-shaft round to its original position. At this change the cam $I^3$ actuates the lever $L^2$ and throws in the clutch $L'$. The cam $I^5$ actuates the lever $J^3$ and throws in the clutch $J^2$ of the draft-scroll J. The cam $I^7$ actuates the lever $K^3$ of the clutch $K^2$ of the indrawing-scroll K. The cam $I^8$ releases the belt-shipper H, which is actuated by its spring $H^2$ to shift the belt from the pulleys $G^2$ $G'$ over upon the pulleys G G', thus bringing the parts into condition as first above stated, when the operation as above described will be repeated.

At any time, if the attendant desires to stop the machine, he rotates the shipper-rod $h$, which, by drawing on the chain $H^5$, thereby moves the shipper, so that the belt is shifted entirely onto the loose pulley $G^2$.

What I claim as of my invention, and desire to secure by Letters Patent, is—

1. The combination of the frames provided with inclined guideways $a$, the roller-beam D, having the roving-drums, spool-supporting standards $d$ and delivering-rolls mounted thereon, the back shaft B, the sprocket-wheels $B'$, fixed on said shaft, the guide-sheaves $S^5$, the chains $D^2$, attached to said roller-beam and passing around said sprockets and sheaves, and means for imparting backward and forward rotative action to said shaft, for the purpose set forth.

2. The combination, with the spindles and spindle-driving mechanism, of the movable carrier or roller-beam having the roving-drums and roving-delivering rolls mounted thereon and supported to slide back and forward on guideways $a$ upon the frames A, the back shaft, B, operating chains or bands fixed to said roll-beam and engaging with sheaves or sprockets on said back shaft, and guide-sheaves in rear of the spindles, the indrawing and outdrawing scrolls with their scroll-ropes connecting with said back shaft, and means for alternately operating said scrolls, substantially as set forth.

3. The combination, with the spindles, roller-beam, and roving-drums, of roving-delivering mechanism, consisting of a tubular bottom roll extending across a series of rovings, top rolls coupled together in pairs by a short axle, $e'$, the respective pairs of rolls being retained parallel to said bottom roll by bearing-plates having at their front ends a groove that embraces the roll-coupling axle between the pair, a fulcrum-support for said bearing plates fixed to the roller-beam, and springs at the rear ends of said plates that act to force the front ends of said bearing-plates down upon the roll-axles, substantially as described, for the purpose set forth.

4. A pair of top rolls coupled together by an axial shaft and supported at a central position by a bearing-plate having a longitudinally-rounded bearing-surface, in combination with the bottom roll, the devices for retaining said bearing-plate in position on the frame, and a spring for giving a yielding pressure thereon, substantially as set forth.

5. The coupled top rolls, the bearing-plates $E^2$, having roving-guides $e^5$ formed thereon, the fixed fulcrum-bar $E^3$, and springs $E^4$, in combination with the movable roller-beam D, roving-drums $D'$, and bottom roll, $E'$, substantially as set forth.

6. In a bearing-plate having a longitudinally-rounded bearing for receiving the roll-axle, a transverse groove or lugs for locking it under a fulcrum-bar, and a rearward extension, in combination with the roller-beam, the fulcrum-bar, the presser-rolls connected in pairs by a bearing-axle, and a spring disposed to act on said rearward extension, substantially as and for the purpose set forth.

7. The combination of the backwardly and forwardly moving roller-beam having the roving-drums and delivering-rolls mounted thereon, the back shaft provided with winding-wheels and with sprockets and bands connected for moving said roller-beam and rolls, the draft-scroll J, indrawing-scroll K, and ropes $J^6$ and $K^5$, connecting said scrolls and winding-wheels for operating said back shaft, the take-up mechanisms O, $O^3$, $O^4$, and $O^5$, and means for imparting motion to said scrolls alternately, substantially as set forth.

8. The combination of the back shaft, B, the draft-scroll J, the indrawing-scroll K, the winding-wheels M and N, and the ropes connecting said scrolls and winding-wheels, the clutches $J^2$ and $K^2$, the operating-shaft F, and connecting-gears $J^4$, $J^5$, and $K^6$, substantially as and for the purposes set forth.

9. The combination, with the draft-scroll and indrawing-scroll mechanisms in a spinning-machine, of yielding take-up mechanism, substantially as described, connected with said scrolls for compensating for the variations in the winding and unwinding of the respective scrolls in relation to each other, substantially as and for the purpose set forth.

10. The combination, with the draft-scroll J, its rope $J^6$, and the back shaft, B, provided with the winding-wheel M, of the spring-drum O, the coiled spring $O^7$, arranged within said drum, and the strap $O^3$, connecting said drum with the hub of said draft-scroll, substantially as and for the purpose set forth.

11. The combination of the indrawing-scroll K, the scroll-rope $K^5$, the back shaft, B, the winding-wheel N, the spring-drum $O^5$, the strap $O^3$, and spring $O^7$, substantially as and for the purpose set forth.

12. The winding-wheel M, provided with the protuberant extension $m$ and adjustable extension or projection $m'$, and means, as described, for effecting adjustment thereof, in combination with the back shaft, B, the draft-scroll J, and scroll-rope $J^6$, substantially as and for the purpose set forth.

13. The winding-wheel M, provided with an adjustable protuberant extension-piece, $m'$, detachably secured thereto by bolts passing through slots or attaching devices, whereby adjustment is effected, in combination with the back shaft, B, the draft-rope $J^6$, and the draft-scroll J, substantially as and for the purposes set forth.

14. The combination of the scroll-rope and rope-connecting device, as described, with the draft-scroll constructed, substantially as described, to permit attachment of said rope-connecting device thereto at different points around the peripheral rim thereof.

15. A draft-scroll, J, the peripheral rim of which is provided with a series of holes, $J^7$, in combination with a draft-rope, $J^6$, and a detachable hook, $J^8$, for attaching the rope thereto at different positions of adjustment, substantially as and for the purposes set forth.

16. The combination, with the spindle-driving cylinder C and the head-operating shaft F, provided with a pulley, $F^2$, of the pulley G, keyed to the cylinder-shaft, the pulley $G'$, provided with a hollow axle or sleeve-bearing running loose on said shaft, the pulley $G^2$, running loose on said sleeve, the pulley $G^3$, keyed to said sleeve, and the belt $F'$, connecting said latter pulley with the pulley $F^2$, substantially as shown and described.

17. The combination of the spindle-driving cylinder, its shaft provided with the driving-pulleys G $G'$ $G^2$ $G^3$, the operating-shaft F, provided with pulley $F^2$ and belt $F'$, the scroll-shaft $J'$, connected with said operating-shaft by gears $J^4$ $J^5$, the sprocket L and chain $l$, the roving-drums and roving-rolls, clutch $L'$, lever $L^2$, and cam $I^3$, the cam-shaft I, and gears $F^6$ and $F^7$, substantially as and for the purposes set forth.

18. The combination of the cylinder-shaft provided with the driving-pulleys G $G'$ $G^2$ $G^3$, the operating-shaft F, provided with the pulley $F^2$ and belt $F'$, the cam-shaft I, having the escapement mechanism and cams $I^5$ and $I^7$, the scroll-shafts $J'$ and $K'$, scrolls J and K, gears $J^4$, $J^5$, $K^6$, $F^6$, and $F^7$, clutches $J^2$ and $K^2$, levers $J^3$ and $K^3$, ropes $J^6$ and $K^5$, and back shaft, B, operated by said ropes from said scrolls, substantially as and for the purposes set forth.

19. The combination, with the escape-lever P, sliding bar R, support-bar $R^3$, and movable roller-beam D, of the adjustable roving stop-lever $R'$, pivoted on said slide-bar by a stud, $r^4$, adjustable to different positions along said bar, and its fulcrum-block $R^2$, adjustably fixed to its support-bar by the clamp-screw $r^5$, substantially as set forth.

20. The slide-bar R, having stops $r$ $r'$, in combination with the escape-lever P, cam-shaft escapement, and movable roller-beam D, substantially as and for the purpose set forth.

21. The quadrant-chain arranged about guide-sheaves $D^4$ and $Q^8$ and secured to the quadrant and winding-drum $C^2$ on the spindle-driving cylinder, in combination with said sheaves $D^4$ and $Q^8$, the movable carrier or roll-beam, the quadrant devices, and the winding-drum, substantially as set forth.

22. The combination of the quadrant provided with a swing-piece, $Q'$, having the sheave $Q^8$ atttached to the traverse nut, the roller-beam D, carrying the sheave $D^4$, the winding-drum $C^2$, spindle-driving cylinder, and the chain $Q^9$, arranged about the sheaves $D^4$ and $Q^8$, with its ends respectively connected to said quadrant and to the winding-drum, substantially as and for the purpose set forth.

23. The combination of the quadrant-arm Q, the quadrant-screw $q$, the traverse nut having the swing-piece $Q'$, pivoted thereto, chain $Q^9$, connected to said swing-piece, the gears $Q^2$ and $B^3$, hollow shaft $Q^3$, shaft $Q^4$, connected by bevel-gears to the quadrant-screw, clutch $Q^5$, sprockets $Q^6$ and $B^4$, chain $Q^7$, and back shaft, B, substantially as and for the purpose set forth.

24. The combination of the quadrant Q, having the swing-piece, with sheave $Q^8$, the chain $Q^9$, roller-beam D, carrying sheave $D^4$, the winding-drum $C^2$, take-up band $C^3$, the spring-drum $O^6$, the spring $O^7$, the back shaft, B, and means for imparting motion to said quadrant from said back shaft, substantially as and for the purpose set forth.

25. The combination, with the cam-shaft, cylinder, winding-drum, and clutch connecting said drum on the cylinder, of a friction-disk connected with the pawl of said clutch and a brake working in conjunction with the surface of said disk, and actuated by a cam on the cam-shaft to prevent engagement of the pawl-and-clutch ratchet during backward rotation of the cylinder, substantially as set forth.

26. The combination, with the cam-shaft Q, the cylinder, winding-drum $C^2$, its pawl $C^5$, ratchet-wheel $C^4$, and spring $C^6$, of the disk T, provided with pins or lugs embracing said spring, the brake-lever $T^2$, working against said disk, and a cam, $I^9$, connected with the cam-shaft I, for pressing said lever against the surface and retarding said disk during the backing-off action, substantially as and for the purpose set forth.

27. The combination, with the spindles S, band $b$, and spindle-driving cylinder C, having a pulley, $C^7$, of a swinging bracket, a friction-wheel mounted in said swinging bracket and provided with a pulley, a belt connecting said pulley with the pulley on the cylinder-shaft, an operating friction-wheel, as $V^5$, and mechanism for moving the swinging bracket to throw the surfaces of the friction-wheels in and out of contact, for the purposes set forth.

28. The combination, with the cam-shaft Q, cam $Q^5$, cylinder C, and operating-shaft F, of the friction-wheels V and $V^5$, the swinging bracket $V'$, provided with arm $V^6$, engaging a cam, $I^5$, on the cam-shaft I, the pulleys $V^3$ and $C^7$, and belt $V^4$, substantially as and for the purpose set forth.

29. The combination of the roller-beam D, the easing-in lever W, the twist-wheel $W^4$, the chain $W'$, connecting said lever and the twist-wheel axle $W^3$, and means for rotating said twist-wheel, substantially as and for the purpose set forth.

30. The combination of the easing-in lever W, provided with a counterbalancing-weight, $W^8$, and having a series of holes for the attachment of the draft-chain, the twist-wheel having an index-pin, $w^2$, and a draft-chain, one end detachably connected to said lever and the other end connected for winding up on the twist-wheel axle, and means for rotating said twist-wheel, substantially as set forth.

31. The twist-wheel $W^4$, its shaft $W^3$, carrying the cam $W^9$, and rotatable in bearings on a swinging support-bracket, $W^5$, having the lever $W^7$ thereon, in combination with the operating-shaft F, provided with a worm, $F^8$, for working said twist-wheel, the cam-shaft I, provided with escapement-wheel and cam $I^{10}$, and the escape-lever P, provided with the inclined plate $P^3$, for engaging with said cam $W^9$, substantially as and for the purposes set forth.

32. The combination of the twist-wheel $W^4$, means for rotating said twist-wheel, the twist-wheel shaft $W^3$, the cam $W^9$, fixed on the end of said shaft, the inclined bearing-plate $P^3$, engaging said cam, and the escapement-lever P, substantially as and for the purpose set forth.

33. The combination, with the reciprocating carrier 12 and cop-builder lever X, of the vertically-moving slide 18, having the cop-forming block 20 hinged to the top thereof, said slide and block being severally provided with lugs or pins 26 and 27, the inclined gage-plates 21 and 22, arranged side by side, the movable shoe 23, to which said plates are attached, the cop-builder screw 25, and means for operating said screw, said parts being disposed in relation to each other, substantially as shown and described.

34. The combination, with the reciprocating carrier 12, having the cop-forming block 20, gage-plates 21 and 22, a vertically-moving slide and cop-builder screw 25, mounted thereon, and provided with a rack, 13, and the back shaft provided with a sprocket-wheel, 17, of the pinion 14, sprocket-wheel 15, and drive-chain 16, and means for operating the cop-builder screw and back shaft, substantially as and for the purpose set forth.

35. The combination of the reciprocating carrier 12, vertically-moving slide 18, having the cop-forming block 20 supported thereon, inclined adjustable gage-plates 21 and 22, engaging-pins 26 and 27 on said slide and block, gage-plate-supporting shoe 23, having a nut, 24, cop-builder screw 25, provided with the ratchet-wheel 92, the lever 28, carrying the pawl 29 for engagement with said ratchet, inclined pivoted guide-bar 30, and adjustable bar, supporting pin 31, as herein shown and described.

36. The faller-trip lever Z, provided with the arm or finger $Z^2$, in combination with the movable roller-beam D, faller-lock bar Y, and the lever X, carrying the roll $x^5$, substantially as set forth.

37. The combination of the faller-trip lever Z, the rod $Z^3$, having a slot, $z^4$, engaging a stud on said trip-lever, the escape-lever P, cam-shaft I, having the escapement mechanism, the faller-lock Y, and means for drawing in the faller-lock, substantially as set forth.

38. The adjustable inclined striker-piece $y^3$, having slots for its attaching-bolts $y^{31}$, in combination with the faller-lock bar Y, faller-lock chain $Y'$, tripping-lever Z, rod $Z^3$, and escape-lever P, substantially as and for the purpose set forth.

Witness my hand this 23d day of September, A. D. 1886.

EDWARD WRIGHT.

Witnesses:
CHAS. H. BURLEIGH,
ELLA P. BLENUS.